No. 815,509. PATENTED MAR. 20, 1906.
E. W. CAMPAGNA.
MEASURING INSTRUMENT.
APPLICATION FILED JULY 16, 1904.
2 SHEETS—SHEET 1.
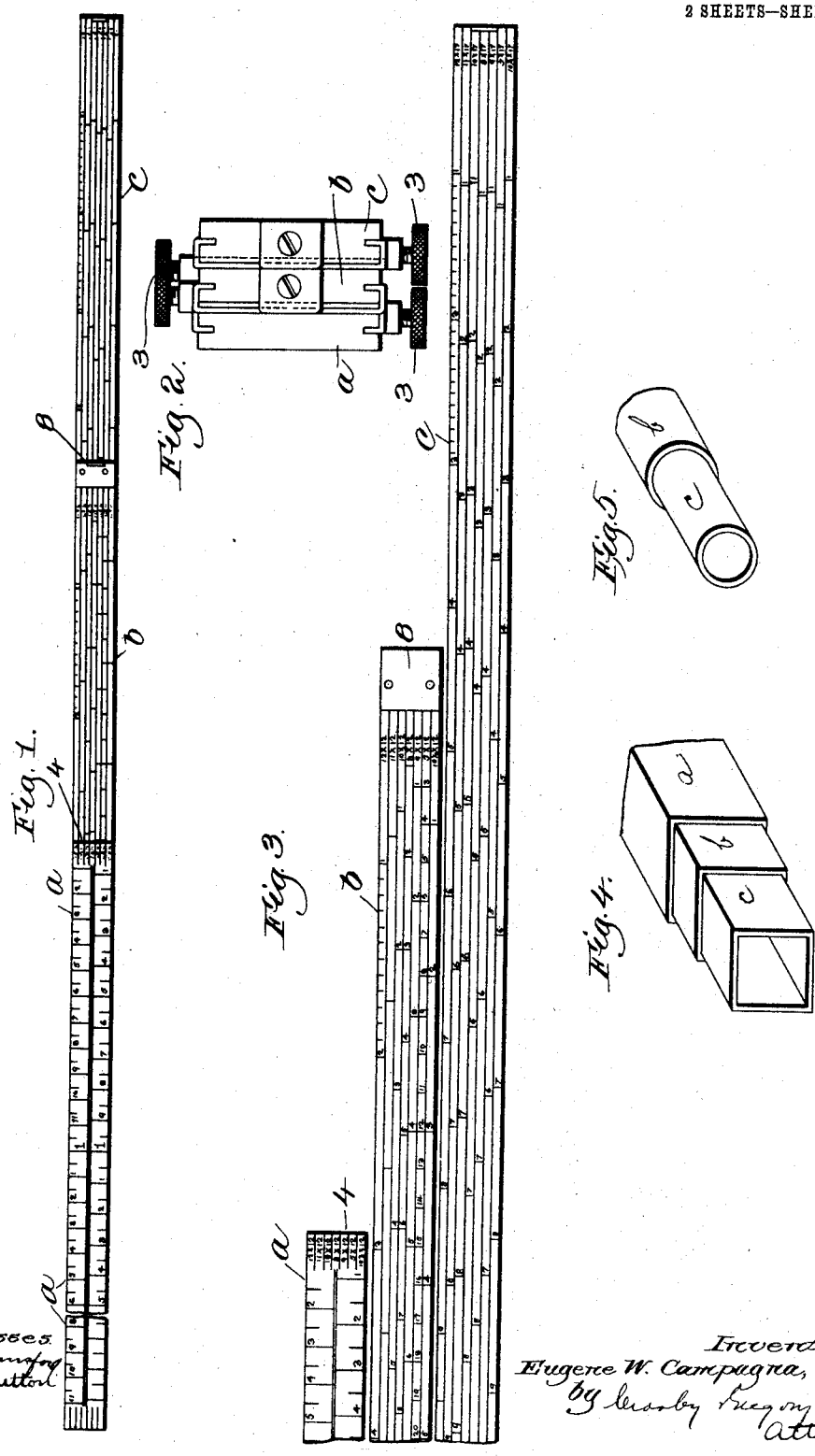
Witnesses
W. C. Lunsford
S. W. Lutton
Inventor
Eugene W. Campagna,
by Crosby Gregory
Atty's.

No. 815,509. PATENTED MAR. 20, 1906.
E. W. CAMPAGNA.
MEASURING INSTRUMENT.
APPLICATION FILED JULY 16, 1904.
2 SHEETS—SHEET 2.
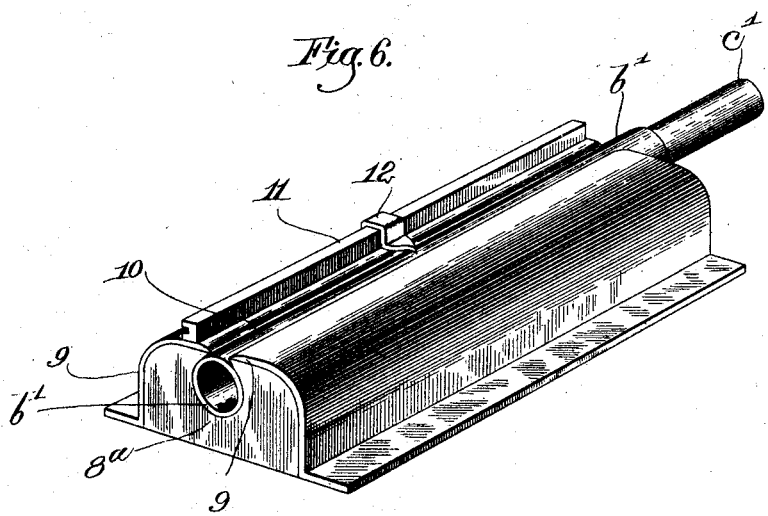
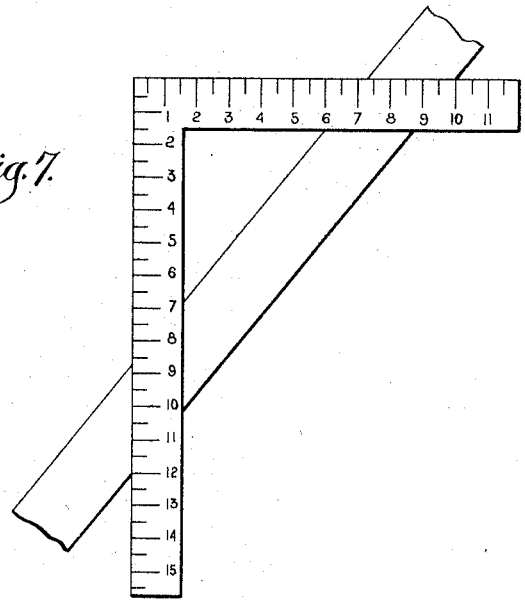

UNITED STATES PATENT OFFICE.

EUGENE W. CAMPAGNA, OF RANDOLPH, MASSACHUSETTS.

MEASURING INSTRUMENT.

No. 815,509.     Specification of Letters Patent.     Patented March 20, 1906.

Application filed July 16, 1904. Serial No. 216,797.

*To all whom it may concern:*

Be it known that I, EUGENE W. CAMPAGNA, a citizen of the United States, residing at Randolph, in the county of Norfolk, State of Massachusetts, have invented an Improvement in Measuring Instruments, of which the following description, in connection with the accompanying drawings, is a specification, like letters and figures on the drawings representing like parts.

In making my present invention I have attempted to provide a simple measuring instrument by which the length of both common and hip rafters for any size building and any pitch roof can be instantly computed. I accomplish this by employing an instrument having two or more parts either telescoping together or slidably connected together, so that they can be extended one beyond the other, one of said parts carrying an indication-mark and another carrying a plurality of scales corresponding to different pitches of roof, these scales being so marked that when said latter part is projected outwardly to bring the indication-mark opposite to any number on any scale the distance which said part projects beyond the indication-mark added to the number on said scale gives the length of the common rafter for the pitch of roof corresponding to said scale. The third part carries another set of scales, which coöperate with another indication-mark in a similar way to give the length of the hip-rafter.

In the drawings, Figure 1 is a view of my instrument set for making a definite measurement, part of the instrument being broken out, so as to allow the remainder to be shown on a larger scale. Fig. 2 is an enlarged view of one form of my scale. Fig. 3 is a diagram showing the method of using my scale. Figs. 4, 5, and 6 are modifications to be described. Fig. 7 shows means for obtaining bottom and plumb cuts for a rafter.

In practice I prefer to make my scale of considerable length—say eight or ten feet long—and one form of my invention comprises three parts $a$, $b$, and $c$, which are slidably mounted on each other so that one can be projected beyond the other. Said parts are held in their adjusted position by suitable set-screws 3. The part $a$ carries a suitable indication-mark, which in this embodiment of my invention is the end "4" thereof. The part $b$ carries the various scales for giving the length of the common rafter. There could be any desired number of scales on the parts $b$ and $c$, each scale corresponding to one pitch of roof, and for convenience I have marked the various scales "12x12," "11x12," "10x12," "8x12," "9x12," &c., these scales corresponding to the roofs, which rise twelve inches to the foot, eleven inches to the foot, ten inches to the foot, &c. Each of the scales on the part $b$ is graduated or marked in such a way that when the indication-mark "4" is placed opposite a number on any scale the length of the part $b$ projecting beyond the indication-mark, added to a length in feet corresponding to the number at which said indication-mark points, gives the length of a common rafter of a roof having the pitch indicated by the scale when one-half the width of the building is the number at which the indication-mark points. To use this portion of the measure, therefore, it is merely necessary to select the particular scale which corresponds to the pitch of roof and then project the part $b$ beyond the part $a$ until the indication-mark coincides with a number on said scale equal to one-half the width of the building in question, when the distance that the part $b$ projects beyond said indication-mark is the actual amount necessary to add to one-half the width of the building to obtain a rafter of the desired length. The length of the rafter can therefore be marked off on the piece from which the rafter is to be cut by first measuring off on said piece a distance equal to one-half the width of the building and thereafter laying my improved measure, after having been properly adjusted, on the said piece so that the indication-mark "4" comes at the end of the distance already measured off and then making a mark on the rafter at the end of the part $b$. This operation saves the necessity of making any computation. The part $c$ of the measure is also provided with a plurality of scales corresponding to the different pitches of roof, and said scales are marked for convenience "12x17," "11x17," "10x17," &c., 17 being the unit for the shadow of the hip-rafter. Said scales on the part $c$ are so graduated that the distance which said part projects beyond $b$ is the actual amount which the hip-rafter for a certain pitch is longer than the common rafter.

To illustrate the operation of the device, et us assume that a building is eight feet wide and the roof of the building has a rise of ten inches to the foot run. In order to ascertain the length of the common rafter, the part $b$ will be projected beyond the part $a$ until the numeral "4" (which is one-half the width of the building) coincides with the indication-mark "4," and said part $b$ will be then clamped in this position. This is the position of the parts shown in the diagram, Fig. 3. The distance which the part $b$ projects beyond $a$ is the actual length which it is necessary to add to four feet (one-half the width of the building) to make the length of the common rafter, and therefore after measuring off a length on the piece from which the rafter is cut equal to one-half the width of the building my improved measure can be laid down on said piece with the indication-mark "4" opposite the end of the length thus measured, and the piece can be cut at the end of the part $b$ to give a rafter of the correct length. For convenience I propose to place on the part $a$ suitable scales in feet and inches, (one of the scales illustrated in the drawings being in inches and the other in tenths of a foot,) and as the part $a$ is actually some ten feet long it will be seen that after the measure has been adjusted, as above described, the length of the rafter in a building one-half the width of which is four feet and the roof of which has a rise of ten inches to the foot run can be measured on any piece by placing my improved measure on said piece with the four-foot mark on the part $a$ at one end of the piece and marking said piece at the end of the projected part $b$. This makes it absolutely unnecessary to measure off any distance on the piece from which the rafter is cut by feet and inches. For giving the length of the hip-rafter the part $c$ is projected beyond the part $b$ until the indication-mark "8" on said part $b$ comes opposite the numeral "4" (this being one-half the width of the building) on the scale on part $c$ corresponding to the pitch of roof, when the amount that the part $c$ projects beyond "8" added to the common rafter will give the length of the hip-rafter. In obtaining the length of the hip-rafter it is always necessary to first adjust the part $b$ for the common rafter and afterward adjust the part $c$ to get the length of the hip-rafter. When the three parts are adjusted, the length of a hip-rafter in a building of the dimensions above given is measured off on a piece merely by placing the four-foot mark on the part $a$ at one end of said piece and marking on said piece at the end of the projected part $c$.

When my improved measure is employed, it is entirely unnecessary to do any mental calculation or to measure off in feet and inches any definite length upon the piece from which the rafter is cut.

I propose also to mark on the part $a$, if desired, a scale indicating feet and tenths of a foot, as well as feet and inches. This is not essential to my invention, however.

When the parts of the measure are assembled, they are placed one on the other, and therefore the scales on the part $c$ are covered by the part $b$ except as said part $c$ is projected beyond $b$. Similarly the part $a$ covers the scales on part $b$ except when said part $b$ is projected beyond $a$.

For convenience in reading and setting the instrument I propose to divide the end of the part $a$ into spaces corresponding to the scales on the part $b$ and mark said spaces "12x12," "11x12," "10x12," "9x12," "8x12," &c., to correspond with the measuring on the end of part $b$. Said parts may be arranged in the form of tubes which telescope one within the other, if desired, without departing from the invention, and in Fig. 4 I have shown square tubes arranged one within the other. In Fig. 5 I have shown the parts in the form of cylindrical tubes.

For the use of architects and similar persons I would prefer to make the instrument as shown in Fig. 6, wherein the part $b'$ (corresponding to $b$ in Fig. 3) is made tubular and is supported in suitable stands $8^a$ beneath the table 9, having a slot 10 therein. Said tubular part will have a plurality of scales on its periphery either cut into the material of said part or printed on paper or other material which is wrapped around said part. Slidably mounted on a guide-bar 11, carried by the table, is an indication-mark "12," which can be brought to register with any graduation-mark of any one of the scales, as desired. The part $b'$ is rotatable in its supports, so that any scale can be brought beneath the indication-mark, and by sliding the indication-mark along to the proper division-mark of the proper scale the length of the common rafter for any pitch roof can be readily determined by the scale. Within the part $b'$ a part $c'$ is telescoped, which part carries the scales for the hip-rafter. In the form of the invention shown in Fig. 6 I propose to make the scales of a suitable size for architects' use. In connection with this form of my invention I propose to use a tape-measure having a scale corresponding to the scales of the instrument, and after the instrument has been set by placing the indication-mark opposite the proper graduation-mark on any one of the scales on the part $b'$ I can get the length of the rafter by placing the tape-measure with the graduation thereon corresponding to one-half the width of the building at the left-hand end of the part $b'$ and then noting the part on the tape-measure with which the indication-mark coincides, this point giving the total length for the common rafter.

For obtaining the bottom and plumb cuts of a rafter I prefer to use the square, as shown in Fig. 7. Suppose, for instance, that the pitch of the roof is a ten-inch rise in a foot run or ten inches rise in a twelve-inch run. I place the square on the rafter, as shown in Fig.

7, so that the edge of the rafter will mark the twelve-inch mark on one leg and the ten-inch mark on the other. The plumb and bottom cuts of the rafter can then be marked by the square.

In designating the various scales "12×12," "11×12," 10×12," &c., the left-hand or variable figure indicates the rise in every twelve inches.

For assisting in getting the extra measurements where the width of a building is not expressed in even numbers, but instead by fractions, I propose to divide the space between the graduation-marks on each of the scales into twelve subdivisions, each one indicating the gain in the length of a rafter for an added inch in the width of a building. If, therefore, one-half the width of the building is four feet and eight inches, the part $b$ will be projected beyond the part $a$ until the indication-mark "4" comes opposite "4 8/12ths" on the proper scale. I regard this manner of subdividing as very important, as it permits me to get the length of a rafter, no matter what the width of the building is, without any computation.

In determining the length of a rafter with my improved instrument we start with a known quantity—to wit, one-half the width of a building—and the amount which it is necessary to determine is an unknown quantity—to wit, the difference between the length of the rafter and the width of the building. This known and unknown quantity have a certain definite relation to each other for any pitch of roof, and the scales on the part $b$ and $c$ are so graduated as to give this unknown quantity.

Although the specific form of my invention I have above described is especially applicable for determining the length of a rafter, yet, since the same principle of calculation is involved in determining the length of a brace as is involved in determining the length of a rafter, it will be obvious that with suitable modifications my invention can be utilized in determining the length of braces.

A measure embodying the principles of my invention—that is, one which is scaled to give an unknown quantity which has a definite relation to a known quantity—could be devised for determining the circumference of a circle by simply making the graduations on the scale on the part $b$ such that the amount which said part $b$ projects beyond the indication-mark "4" when said indication-mark is set at a particular graduation-mark will give the amount which it is necessary to add to three times the diameter of a circle to make the circumference. In using this scale for this purpose the part $b$ would be projected beyond the part $a$ until the mark "4" coincided with the indication-mark bearing the number corresponding to the diameter of the circle in question, and said mark would be so placed on the scale that the length which the part $b$ projects beyond the part $a$ would give the amount necessary to add to three times the diameter of the circle to give the length of the circumference. In this case the known quantity is the diameter of the circle and the unknown quantity the difference between three times the diameter and the length of the circumference.

Various other uses to which my invention may be put will suggest themselves to those skilled in the art.

From the above it will be seen that I have devised a very simple instrument for expeditiously determining and giving the desired amount of variable quantity when the variable quantity bears certain definite relations to a fixed known quantity, and although I have described some specific application of invention I do not wish to be limited thereto.

Having fully described my invention, what I claim as new, and desire to secure by Letters Patent, is—

1. A measuring instrument comprising two parts movable with relation to each other, one of said parts having an indication-mark, and the other carrying a plurality of scales corresponding to different pitches of roof, each scale being so marked that the distance from any graduation-mark thereon to the end of the scale is the amount which a rafter for a roof of the pitch corresponding to said scale is longer than the run of said rafter, in a building one-half the width of which is equal to the number of said graduation.

2. A measuring instrument comprising two parts movable with relation to each other, one of said parts having an indication-mark and the other carrying a plurality of scales corresponding to different pitches of roof, each scale being so marked that the distance from any graduation-mark thereon to the end of the scale is the difference between the length of a rafter for a roof of a pitch corresponding to said scale in a building one-half the width of which is measured by the number of said graduation, and one-half the width of said building, combined with a third part movable with relation to the other two parts, said third part having scales thereon for giving the length of the hip-rafter.

3. A measuring instrument comprising three parts slidable with relation to each other, the outer or upper part being provided with an indication-mark, the intermediate part having on its face over which the outer or upper part moves one or more scales, each being so marked that the distance between any graduation-mark thereon and the end of the scale is the difference between a known measurement and a desired measurement when the known and desired measurements have a definite relation to each other, said intermediate part also having an indication-mark, and the face of the inner or third part being provided with one or more scales, each marked similarly to the scales on the intermediate part but adapted for giving a different measurement from those on the intermediate part.

4. A measuring instrument comprising two parts movable with relation to each other, the face of one of said parts being scaled in feet and inches, an indication-mark carried by said part, the face of the other part carrying a plurality of scales corresponding to different pitches of roof, each scale being divided into divisions each of which is subdivided into twelfths, said divisions being so arranged that the distance from any graduation-mark on any scale to the end of the scale is the difference between the length of a rafter for a roof of a pitch corresponding to said scale in a building one-half the width of which is measured by the number of said graduation and one-half the width of said building.

5. A measuring instrument comprising two parts movable with relation to each other, one of said parts having scales in feet and inches and an indication-mark, and the other part carrying a plurality of scales corresponding to different pitches of roof, the main graduations on each of said latter scales being subdivided into twelve subdivisions and each of said scales being so marked that the distance from any graduation on any scale to the end of said scale is the difference between the length of a rafter for a roof of a pitch corresponding to said scale in a building one-half the width of which is measured by the number of said graduation and one-half the width of said building.

6. A measuring instrument comprising three parts slidable one on the other, one part having an indication-mark, the second and third parts each having marked thereon a plurality of scales corresponding to the different pitches of roof, each scale on the second part being so marked that the distance from any graduation-mark thereon to the end of the scale is the difference between the length of a common rafter for a roof of a pitch corresponding to said scale in a building one-half the width of which is measured by the length of the scale and one-half the width of the building, and each scale on the third part being so marked that the distance from any graduation-mark thereon to the end of the scale is the difference in length between a hip-rafter and a common rafter for a roof of a pitch corresponding to said scale in a building one-half the width of which is measured by said graduation.

7. A measuring instrument comprising three parts superposed one on the other and each part slidable with relation to the others, the top part having its exposed face marked to indicate feet and inches, and its end constructed to constitute an indication-mark, the intermediate part having on its face over which the top part moves a plurality of scales corresponding to different pitches of roof, each scale being so marked that the distance between any graduation-mark thereon to the end of the scale is the difference between the length of a common rafter of a roof of a pitch corresponding to said scale in a building one-half the width of which is indicated by the said graduation-mark and the run of said rafters, the end of said intermediate part constituting an indication-mark for the scales on the third part, and the face of the third part with which the intermediate part contacts being provided with a plurality of scales, each so marked that the distance from any graduation-mark thereon to the end of the scale is the difference in length between a hip-rafter and a common rafter for a roof of a pitch corresponding to said scale in a building one-half of the width of which is indicated by said graduation.

8. A measuring instrument comprising three parts slidable with relation to each other, the outer or upper part being provided with an indication-mark, the intermediate part having on its face over which the outer or upper part moves a plurality of scales corresponding to different pitches of roof, each scale being so marked that the distance between any graduation-mark thereon and the end of the scale is the difference between the run and the length of a common rafter in a roof of a pitch corresponding to said scale in a building, one-half the width of which is indicated by the number of said graduation-mark, said intermediate part having also an indication-mark, and the face of the inner or third part being provided with a plurality of scales, each so marked that the distance from any graduation-mark thereon to the end of the scale is the difference in length between a hip-rafter and a common rafter for a roof of a pitch corresponding to said scale in a building, one-half of the width of which is indicated by said graduation.

In testimony whereof I have signed my name to this specification in the presence of two subscribing witnesses.

EUGENE W. CAMPAGNA.

Witnesses:
WILLIAM A. CAMPAGNA,
FRANK B. NEWTON.